(12) United States Patent
Diot et al.

(10) Patent No.: US 7,680,894 B2
(45) Date of Patent: Mar. 16, 2010

(54) MULTIMEDIA CONTENT DELIVERY METHOD AND SYSTEM

(75) Inventors: Christophe Diot, Paris (FR); Augustin Chaintreau, Paris (FR); Augustin Soule, Paris (FR); Christoph Neumann, Rennes (FR); Ali Boudani, Rennes (FR); Kyoungwon Suh, Bloomington, IL (US); Pierre Houeix, Cesson-Sevigne (FR); Mary-Luc Champel, Marpire (FR)

(73) Assignee: Thomson Licensing, Boulogne Billancourt (FR)

( * ) Notice: Subject to any disclaimer, the term of this patent is extended or adjusted under 35 U.S.C. 154(b) by 104 days.

(21) Appl. No.: 12/087,387

(22) PCT Filed: Jan. 8, 2007

(86) PCT No.: PCT/FR2007/050622

§ 371 (c)(1), (2), (4) Date: Jul. 3, 2008

(87) PCT Pub. No.: WO2007/080345

PCT Pub. Date: Jul. 19, 2007

(65) Prior Publication Data

US 2009/0083394 A1   Mar. 26, 2009

(30) Foreign Application Priority Data

Jan. 9, 2006 (FR) .................................. 06 50073
Sep. 5, 2006 (FR) .................................. 06 53577

(51) Int. Cl.
*G06F 15/16* (2006.01)
*G06F 12/00* (2006.01)

(52) U.S. Cl. ...................................... 709/206; 709/231
(58) Field of Classification Search ................ 709/206, 709/207, 217–219, 231
See application file for complete search history.

(56) References Cited

U.S. PATENT DOCUMENTS

| 6,380,950 B1* | 4/2002 | Montgomery et al. ....... 715/723 |
| 7,359,955 B2* | 4/2008 | Menon et al. ............... 709/219 |
| 2002/0126698 A1* | 9/2002 | Deshpande ................. 370/467 |
| 2004/0003090 A1 | 1/2004 | Deeds |
| 2005/0193096 A1* | 9/2005 | Yu et al. ..................... 709/219 |

FOREIGN PATENT DOCUMENTS

| EP | 1338989 | 8/2003 |
| EP | 1341328 | 9/2003 |

OTHER PUBLICATIONS

Search Report Dated Jun. 14, 2007.

* cited by examiner

*Primary Examiner*—Zarni Maung
(74) *Attorney, Agent, or Firm*—Robert D. Shedd; Jeffrey M. Navon

(57) ABSTRACT

The present invention relates to a method for the distribution of multimedia content, comprising:
 a first step comprising a download in "push" mode of a multimedia content, in a partial way, from a content server to a client device, and
 a second step comprising a download of the missing elements of said multimedia content in "pull" mode via a "peer to peer" mechanism from a second client device, and in that the multimedia content can be reconstituted with n+p blocks, n and p being non-null natural integers, n blocks being downloaded during said first step and p blocks being downloaded during the second step, the multimedia content being exploitable only after reception of n+p blocks.

7 Claims, 1 Drawing Sheet

MULTIMEDIA CONTENT DELIVERY METHOD AND SYSTEM

This application claims the benefit, under 35 U.S.C. §365 of International Application PCT/FR2007/050622, filed Jan. 8, 2007, which was published in accordance with PCT Article 21(2) on Jul. 19, 2007 in French and which claims the benefit of French patent application No. 0650073, filed Jan. 9, 2006 and French patent application No. 0653577, filed Sep. 5, 2006.

SCOPE OF THE INVENTION

The present invention relates to the domain of information and communication technologies.

The present invention more particularly relates to a method and a multimedia content distribution system combining a download in "push" mode and a download in "pull" mode via a "peer to peer" mechanism.

PRIOR ART

The prior art knows, from the scientific article "*On the feasibility of Commercial, Legal P2P Content Distribution*" (P. Rodriguez, S-M. Tan and C. Gkantsidis, ACM SIGCOMM Computer Communication Review, vol. 36, N°1, January 2006), the concept of multimedia content distribution via "peer to peer" networks for commercial purposes. However, this scientific article does not disclose a download stage in "pull" mode.

The prior art also knows, through the European patent application EP 1 341 328 (Matsushita Electric Industrial Co.), a data broadcasting system, for the broadcast of multimedia data and a receiver terminal device to receive said multimedia data. The invention described in this European patent application relates to a data reception device to receive and transmit broadcast data comprising a plurality of multimedia data, the device comprising:

- a receiver unit adapted to receive in a sequential manner the plurality of multimedia data included in the broadcast data,
- a transmission unit adapted to transmit received data,
- a storage unit adapted to create and store management information to collectively manage the plurality of multimedia data received and assign information corresponding to respective multimedia data, and
- a management unit adapted to manage multimedia data received in reference to management information.

The prior art also knows, by the American patent application US 2004/003090 (Deeds Douglas), a peer to peer information sharing system. This American patent application describes a system and a method to share data across a network such as Internet. Shared data will often be audio data, but can correspond to other types of data. A server, for example an instantaneous messaging server in communication with the network receives requests to initiate data sharing sessions, the requests comprising the addresses of potential participants. Upon reception of the request, the instantaneous messenger determines if the potential participants are, in fact, connected to the network and, if this is the case, transmits their network addresses to the entity that sent the request so that it can start to transmit the data to each of them. The data is usually played from a recording by one of the participants, but the selection is heard by the group members when it is transmitted, creating a shared listening environment. In order to avoid potential infringements of intellectual property, the data is played but not stored for listening at a later time at the level of the receivers.

The prior art also knows, through the patent application PCT WO 01/10125 (Randall Chung), a VoD (Video on Demand) system, from a server or user to another user. The PCT patent application describes a system and a method to distribute data to multiple final users using a data storage system connected via a data communication network. The final user equipment comprises a data storage unit, such as a magnetic disk for example, to play or record audio or video material. Each data storage unit can store data, such as digital video content (film) or digital audio content (music). The data storage unit can also be configured to store parts or fragments of audio or video digital content. The place of storage and the reading and recording of video or audio digital content are administered, managed and controlled by a central entity. The data for reading video or audio content or parts of this data, can reside on one or more physically distinct data storage units, or can reside on a central data storage unit.

SUMMARY OF THE INVENTION

The present invention intends to overcome the disadvantages of the prior art by proposing an encoding solution particularly adapted to a multimedia content distribution method that combines the "push", "pull" and "peer to peer" modes.

For this purpose, the present invention relates, in the most generally accepted sense, to a method for multimedia content distribution characterized in that it comprises:

- a first step comprising a download in "push" mode of a multimedia content, in a partial way, from a content server to a first client device and
- a second step comprising a download of the missing elements of said multimedia content in "pull" mode via a "peer to peer" mechanism from a second client device, and in that the multimedia content can be reconstituted with n+p blocks, n and p being non-null natural integers, n blocks being downloaded during said first step and p blocks being downloaded during the second step, the multimedia content being exploitable only after reception of n+p blocks.

According to a first variant, the first and second client devices are located under the same DSLAM (Digital Subscriber Line Access Multiplexer) in the context of an implementation based on this transmission mode.

According to a second variant, the client devices are located under the neighbouring DSLAMs.

The client devices can be hard disk set-top boxes or personal computers.

According to a particular implementation, some blocks are systematically loaded onto several client devices, for example blocks enabling viewing of the start of a film or a film with a degraded quality, so that a user can start viewing while waiting for the "Peer to Peer" loading mechanism.

The invention also relates to a system for distribution of multimedia content comprising at least a multimedia content server, a communication network, a DSLAM and at least two client devices.

The present invention also relates to a digital device, characterized in that it comprises:

- means for receiving by download in "push" mode a multimedia content, in a partial way, from a content server, and
- means for receiving by download, the missing elements of said multimedia content in "pull" mode via a "peer to peer" mechanism from a second client device, and in that the multimedia content can be reconstituted with n+p blocks, n and p being non-null natural integers, n blocks being downloaded in "push" mode and p blocks being downloaded in "pull" mode, by a "peer to peer" mechanism, the multimedia content being usable only after the reception of n+p blocks.

BRIEF DESCRIPTION OF THE DRAWINGS

The invention will be better understood from the description that follows of a non-restrictive embodiment of the invention provided as an example in reference to the single FIGURE that illustrates an architecture implementing the method and the system according to the present invention.

Figure 1:
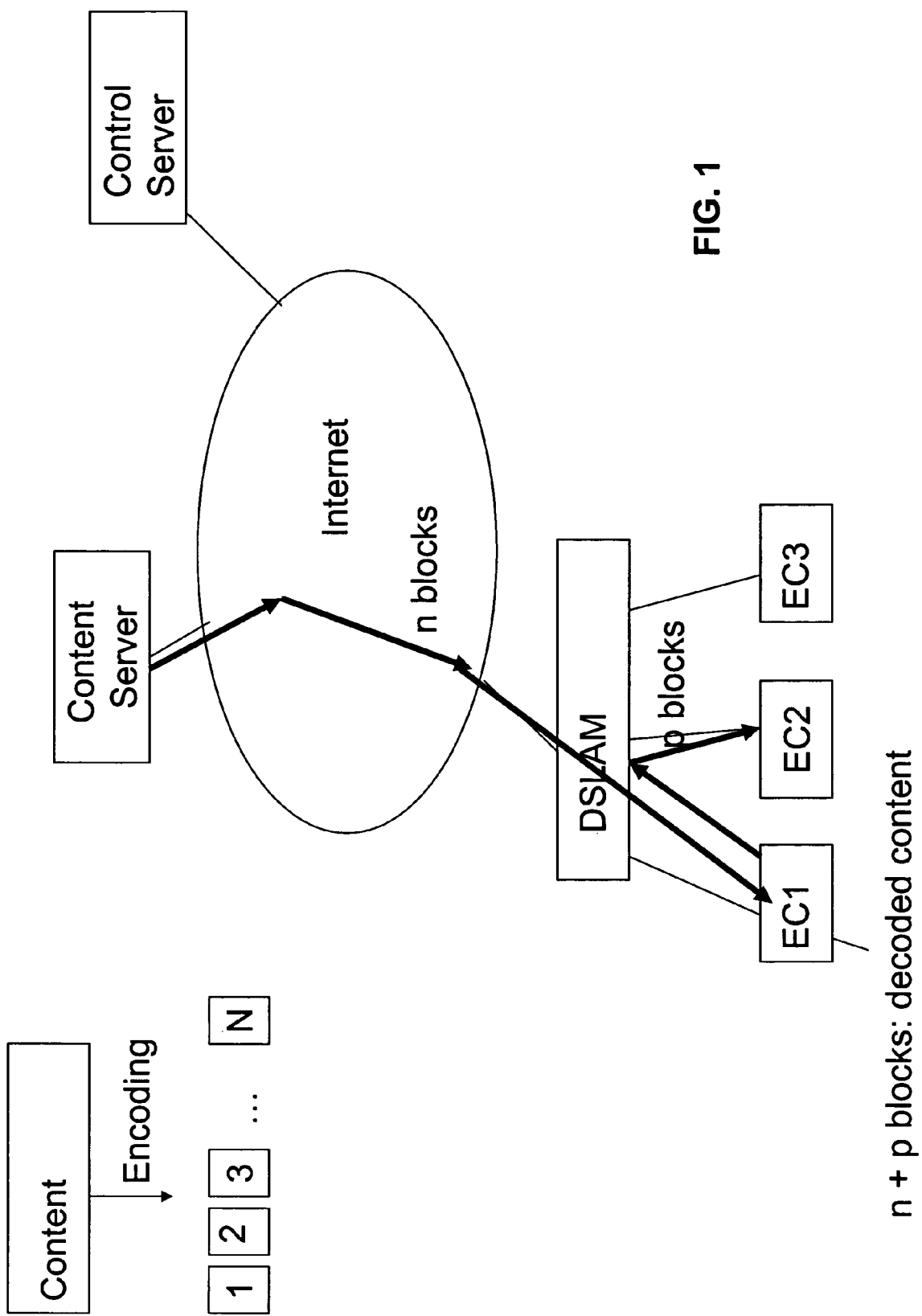

DETAILED DESCRIPTION OF THE
EMBODIMENTS OF THE INVENTION

Initially, a multimedia content is encoded in N blocks, N being a natural integer greater than or equal to 2. The content can be decoded using n+p blocks.

Multimedia content can be, for example, a video document and the system of FIG. 1 is placed in the context of VOD (Video On Demand).

The content is then downloaded in "push" mode from a content server, illustrated in the FIGURE, via a communication network, to client devices EC1, EC2, EC3, etc. Each client device receives n blocks. A client device is a set-top box with a hard disk or a personal computer, and is connected to a communication network via a DSL modem and a DSLAM device. Each client device stores n blocks for later use (on the hard disk for example). The set-top box or computer comprises means in itself to decode or decompress the content as required, and in the case of video content, to generate video and audio signals in an adequate form.

The n blocks that are transmitted (pushed to) to a given client device are determined by the content server. Preferably, the n blocks transmitted to a client device differ from the n blocks transmitted to another client device by at least one block. The content server maintains a database that indicates which blocks are stored at the level of each client device. This database enables a client device to determine from which pair of client devices to request the missing p blocks. Advantageously, this database is stored in a device other than the content server but accessible by the client devices.

According to a particular variant, the multimedia content is encoded in such a way that all combinations of n+p blocks allow decoding of the content. In this case, the client device will search for the missing p blocks on any other client device having these additional p blocks.

In the example, there are three client devices, preferably located under the same DSLAM, n equals 3, p equals 1 and N equals 9. The blocks are coded with a certain inter-block redundancy. The choice of small p (and particularly p equal to 1) enables minimization of the quantity of information to be gathered in "peer to peer" mode and hence accelerates the users access to content. This request can be carried out at the moment when the user decides to view the content, or when he decides to acquire a right to the content.

Each of the three client devices then receives three blocks in "push" mode. In order to be able to exploit the multimedia content, each client device requires an additional block.

A client device will then download in "pull" mode from another client device, the missing block via a "peer to peer" mechanism. This device will therefore request the missing blocks. Hence, the client device can decode the content and exploit it.

The peer to peer mode means that it can avoid having to download missing blocks from the initial server. This mode also enables optimization of network resources and avoids over-soliciting of the content server.

The missing p blocks can be distributed over several devices under the DSLAM.

A search request is sent from a client device EC1 to devices present in a list in which are listed the other devices containing the rest of the content. This list could have been sent first by a control server, upon request from client device EC1.

For example, EC1 sends a request to EC3, EC5 and ECn. EC3 sends one third of the missing content to EC1, EC5 sends the second third of the missing content to EC1 and ECn sends the last third to EC1. A mode can also be considered in which the proportions transmitted by EC3, EC5 and ECn to EC1 are not equal, for example 55%, 30% and 15%.

A message can be sent to the control server when a certain share of the content is deemed valid by the EC1 device.

It can also be imagined that a priority could be established for the supply of missing blocks. For example, in SVC (Scalable Video Coding) mode, the base layer will have the highest priority while the layer referred to as the "enhancement layer" will have a lower priority. The content can be played with only a part of the missing blocks, but with a lower level of quality.

This priority mechanism can be particularly interesting for time critical applications. For example, let us assume that the client device EC1 can tolerate the absence of the first and second thirds of missing content, but requires the last third. In this case, EC1 transmits to devices holding the content, an indication of priority which enables it to respect the time constraint.

A variant of the method comprises the division of the missing content that has strong time constraints, into several parts, of equal size or not. These parts are then transmitted to the client device that made the request.

The "push" step can be implemented via a digital broadcast network conforming to one of the DVB standards, for example DVB-T or DVB-H.

In the scope of the present invention, unicast and multicast mechanisms can be used.

In a particular embodiment, it can proceed in the following manner:
  i) The content server sends the content in its entirety just once using the multicast technique.
  ii) The control server sends specific information to each of the client devices in order to indicate to them which content part they should save and which part to delete.

The advantage of such a mechanism is the low use of the transmission bandwidth. The major inconvenience is that the client devices must be connected during the phase in "push" mode. For devices that are not available during this phase in "push" mode, it is possible to transmit the contents of the content server to client devices in unicast.

During the phase in "pull" mode, multicast can also be used. In fact, a multicast connection can be used so that the EC1 device can benefit the EC2 device that already supplies content to the EC3 device.

The main difference with the unicast approach is that once the control server receives a request concerning content from a client device, the control server initiates two actions:
  i) The sending of a response to the device that made the request telling it to "scan" on one or more specific multicast addresses/ports.
  ii) The sending of a command request to one or more devices that contain the requested content so that they begin broadcasting the content on a multicast connection, whose address/port is contained in the request. The server can also specify whether the content is broadcast in multicast, in carousel mode or just once.

In the case where the control server detects that the content requested is already distributed (or is being distributed) by one or more devices, the control server does not need to send the command request to the broadcast devices. The DSLAM using IGMP mechanisms takes care to supply the requested content to the device, that made the request.

In addition, as a content requesting device can "scan" several multicast connections, a second mechanism is required so that the content requesting device can send a message to the control server when it has finished downloading the content. At this instant, as the control server knows how many devices are listening to the requested content, it can send (or not) a command request to the broadcast device to tell it to cease transmitting. Obviously, this request will be sent only when no device is listening to the multicast connection.

A variant consists in dividing the shared content into several parts. The bigger the parts the more probable it is that several devices are listening to the same parts. The smaller the parts, the more the number of broadcasting devices that contribute to the same content will be heightened, which leads to a probable faster download and a shorter transmission time for the broadcast devices.

In another variant, a redundant coding is introduced so that more receiver devices can listen to the same multicast links. For example to decode a content, only one part of the coded content needs to be received. This coding can be systematic or not.

In another embodiment of the invention, the control server can send, in response to a request, the list of all devices that are broadcasting the requested content. The receiver device chooses how many streams it wants to listen to. The receiver equipment can best use the available transmission bandwidth. The receiver devices send a specific message to the server to indicate which stream they are listening to. This enables the server to know how many devices are listening to a given broadcast device.

Different strategies can be implemented for the first step in "push" mode:
a) Multiplexed versus Dedicated Push
b) Full Copies versus Partial Copies Push
c) Prefix Push
d) Global Earliest Deadline First Policy Multiplexed Versus Dedicated Push The first two content placement strategies concern the number of client devices allocated to a given content, for example a film.

Allocating a client to a film signifies that the parts of the film or its entirety are stored at client level, and that the content can be transmitted to other clients.

A first strategy, called multiplex strategy, consists in allocating a large number of clients to a given film. A second strategy, called dedicated strategy, consists in allocating a small number of clients to a given film. The extreme case of the dedicated strategy is to transmit the content to a single client, while the extreme case of the multiplex strategy is to transmit the content to all the clients.

In the case of the multiplex strategy, the number of potential servers is increased, which causes, in the wired channel hypothesis, the allocated transmission bandwidth for a given content to increase in a linear manner with the number of clients allocated to the content.

The effects of the choice multiplex vs. dedicated are the following:

The increase in the number of clients allocated for a given film increases the supported arrival rate for the film. This increase also increases the startup latency but to a lesser extent.

In the extreme case where the content is transmitted to all clients (full multiplex), it must also be considered that each client already has parts of the content and has only to download the remaining part. Hence, in this case, the quantity of traffic in the network is reduced.

Hence, it is recommended to increase the degree of multiplexing for popular films and to use the more dedicated strategies for less popular films.

Full Copies Versus Partial Copies Push

The following content placement strategies concern the quantity of data stored at the level of a single client allocated for a given film. It is the quantity of data that the client device supplies as server to other clients requesting the content. A (client) server device can store the film entirely or partially.

The effects linked to these strategies are the following:

For the same number of allocated clients, the increase in the quantity stored at the level of each client reduces the startup latency parameter of a film. However, it should be noted that the increase in the number of clients allocated has more effect on the startup latency parameter than the increase in the stored quantity.

For the same number of allocated clients, the increase of the quantity stored at the level of each client has very little impact on the supported arrival rate.

The reduction of the stored quantity at the level of each client increases the overhead generated for this specific film. More precisely, a client must contact more clients in order to download the content, which thus increases the complexity of the signalization and increases the number of TCP connections at the level of each client.

Prefix Push:

This strategy consists in the transmission in push mode of the first seconds or minutes of a given content to all the clients. This data is not used by an allocated client to transmit, as a server, the other content requesting clients. This considerably reduces the parameter called startup-latency. This strategy should only be used for very popular films. In fact, transmitting to all clients the prefix push when the film is viewed only by a small number of clients can be considered a waste of data storage capacity.

Depending on the film's popularity, different push strategies should be implemented in order to optimize the use of resources (transmission bandwidth, data storage, clients etc.).

It is recommended to follow these steps:
a) First, determine the number of clients allocated to each film, choose between push multiplex and dedicated push. The multiplexing should be increased for popular films so that heightened arrival rates are supported for these films. At the same time, in order to minimize the overhead and the consummation of storage capacities, the multiplexing should be reduced for less popular films.
b) Next, the quantity of data storage allocated to each film by each client must be determined. It is recommended to increase the storage for popular films in order to diminish the total quantity of overheads generated by the system. It is also recommended to reduce the data storage quantity for less popular films, as the impact on the total overhead will be weak and this storage space would be better utilized by popular films.
c) Finally, the use of the rest of the available storage space for the prefix push strategy enables adaptation of the startup latency of each film. It is recommended to apply this rule only for the most popular films.

Global Earliest Deadline First Policy

This last strategy is used in conjunction with the preceding strategies.

The "earliest deadline first" is a policy in which the request with the closest deadline must be served before all the other requests. This is trivial with a single content server that must process all the requests, because the content server is aware of the requests and their deadlines. However, in a distributed environment, such as that of the invention, the implementation of a global earliest deadline first policy, in which the request with the earliest deadline must be processed before all other requests in the files of the server devices, is not trivial. The requests can be distributed over several server devices and the system must identify and serve the earliest arrival.

Assuming the presence of a central control server that has an index of all content transmitted during the push step and of its location and that receives the client requests, the policy known as "earliest deadline first" can be implemented at the level of the control server. This policy will be global as all the requests of all the clients were taken into account.

Now assume that each client device has an index of all the content and of its location. In order to distribute the consumption of resources, a client randomly chooses the location from where he downloads the content that he would like to use. Assuming the presence of a central control server, despite having no index of contents and location, a policy of "global earliest deadline first" can be implemented as follows: each server device must inform the control server of its waiting list. The central server plans all the requests according to the "earliest deadline first" policy and sends the list to the clients.

The invention is described in the preceding text as an example. It is understood that those skilled in the art are capable of producing variants of the invention without leaving the scope of the patent. In particular, the embodiment is placed in the context of a transmission by the telephone network and by ADSL (Asymmetric Digital Subscriber Line). Other networks and transmission modes can be considered.

The invention claimed is:

1. Method for distributing multimedia content, comprising:
   a first step comprising a download in "push" mode of a multimedia content, in a partial way, from a content server to a first client device, and
   a second step comprising a download of the missing elements of said multimedia content in "pull" mode via a "peer to peer" mechanism from a second client device (EC2),
   and in that the multimedia content can be reconstituted with n+p blocks, n and p being non-null natural integers, n blocks being downloaded during said first step and p blocks being downloaded during the second step, the multimedia content being exploitable only after reception of n+p blocks.

2. Method for distributing multimedia content according to claim 1, wherein the first and second client devices are located under the same DSLAM.

3. Method for distributing multimedia content according to claim 1, wherein the first and second client devices are located under neighbouring DSLAMs.

4. Method for distributing multimedia content according to claim 1, wherein at least one of the first and second client devices is a set-top box with a hard disk or a personal computer.

5. Method for distributing multimedia content according to claim 1, wherein certain blocks are systematically loaded onto several client devices, for example blocks enabling viewing of the start of a film or films of a degraded quality, so that a user can begin viewing while waiting for the loading by a "Peer to Peer" mechanism to happen.

6. System for the distribution of multimedia content comprising at least a multimedia server, a communication network, a DSLAM and at least two client devices for the implementation of the method according to claim 1.

7. Digital device, comprising:
   means for receiving by download in "push" mode a multimedia content, in a partial way, from a content server, and
   means for receiving by download, the missing elements of said multimedia content in "pull" mode via a "peer to peer" mechanism from a second client device,
   and in that the multimedia content can be reconstituted with n+p blocks, n and p being non-null natural integers, n blocks being downloaded in "push" mode and p blocks being downloaded in "pull" mode, by a "peer to peer" mechanism, the multimedia content being usable only after the reception of n+p blocks.

* * * * *